(12) United States Patent
Jin et al.

(10) Patent No.: US 12,407,039 B2
(45) Date of Patent: Sep. 2, 2025

(54) BATTERY MODULE AND METHOD FOR MANUFACTURING THE SAME

(71) Applicant: LG Energy Solution, Ltd., Seoul (KR)

(72) Inventors: Hee Jun Jin, Daejeon (KR); Sung Won Seo, Daejeon (KR); Kyung Woo Kim, Daejeon (KR); Jeong Oh Moon, Daejeon (KR); Ho June Chi, Daejeon (KR); Jin Yong Park, Daejeon (KR); Jhin Ha Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 718 days.

(21) Appl. No.: 17/783,148

(22) PCT Filed: Apr. 30, 2021

(86) PCT No.: PCT/KR2021/005531
§ 371 (c)(1),
(2) Date: Jun. 7, 2022

(87) PCT Pub. No.: WO2021/251624
PCT Pub. Date: Dec. 16, 2021

(65) Prior Publication Data
US 2023/0023147 A1    Jan. 26, 2023

(30) Foreign Application Priority Data

Jun. 10, 2020   (KR) .................. 10-2020-0070473

(51) Int. Cl.
*H01M 10/6554* (2014.01)
*H01M 10/04* (2006.01)
(Continued)

(52) U.S. Cl.
CPC ....... *H01M 10/6554* (2015.04); *H01M 10/04* (2013.01); *H01M 10/613* (2015.04); *H01M 10/647* (2015.04)

(58) Field of Classification Search
None
See application file for complete search history.

(56) References Cited

U.S. PATENT DOCUMENTS

| 2012/0060921 A1 | 3/2012 | Jee |
| 2012/0171543 A1 | 7/2012 | Hirsch et al. |

(Continued)

FOREIGN PATENT DOCUMENTS

| CN | 104993188 A | 10/2015 |
| EP | 3032607 A1 | 6/2016 |

(Continued)

OTHER PUBLICATIONS

International Search Report for PCT/KR2021/005531 dated Aug. 6, 2021. 3 pgs.

(Continued)

*Primary Examiner* — Alix E Eggerding
(74) *Attorney, Agent, or Firm* — Lerner David LLP

(57) ABSTRACT

The present invention relates to a battery module comprising: a plurality of battery cells disposed to overlap each other in a thickness direction thereof; a battery case configured to accommodate the battery cells and having a structure of which a lower portion is opened; and a heat dissipation member comprising a cover plate coupled to the lower portion of the battery case to support the battery cell and a heat dissipation body provided on one surface of the cover plate, on which the battery cell is supported, to dissipate heat generated in the battery cell, wherein the heat dissipation body comprises a first heat transfer material provided to be connected to a center of one surface of the cover plate in a longitudinal direction of the battery cell and a second heat transfer material provided on both portions of the first heat transfer material and having a structure aligned in a plurality of rows in the longitudinal direction of the battery cell, and the second heat transfer materials are aligned so that an (Continued)

interval therebetween is gradually narrowed from a center toward both ends of the battery cell to gradually improve heat dissipation performance from the center toward both the ends of the battery cell.

13 Claims, 15 Drawing Sheets

(51) Int. Cl.
  *H01M 10/613* (2014.01)
  *H01M 10/647* (2014.01)

(56) References Cited

U.S. PATENT DOCUMENTS

| | | |
|---|---|---|
| 2014/0015118 A1 | 1/2014 | Bae et al. |
| 2016/0197385 A1 | 7/2016 | Matsumoto et al. |
| 2020/0006823 A1 | 1/2020 | Chung et al. |
| 2020/0083575 A1 | 3/2020 | Yoo et al. |
| 2020/0313253 A1 | 10/2020 | Ahn |
| 2021/0344061 A1* | 11/2021 | Roemelsberger ... H01M 50/204 |
| 2021/0359357 A1 | 11/2021 | Chung et al. |
| 2022/0131207 A1 | 4/2022 | Ahn |
| 2022/0209330 A1* | 6/2022 | Walter ............. H01M 10/6551 |

FOREIGN PATENT DOCUMENTS

| | | |
|---|---|---|
| JP | 2015153743 A | 8/2015 |
| JP | 2018018629 A | 2/2018 |
| JP | 6620478 B2 | 12/2019 |
| KR | 20120017613 A | 2/2012 |
| KR | 20140009731 A | 1/2014 |
| KR | 20170019041 A | 2/2017 |
| KR | 101827402 B1 | 2/2018 |
| KR | 20190047513 A | 5/2019 |
| KR | 20190092835 A | 8/2019 |
| KR | 20190095047 A | 8/2019 |
| KR | 102065748 B1 | 1/2020 |
| KR | 20200003600 A | 1/2020 |
| KR | 20200004202 A | 1/2020 |
| KR | 20200044423 A | 4/2020 |

OTHER PUBLICATIONS

Extended Search Report for Application No. 21822818.7 dated Jul. 18, 2023. 6 pgs.

Search Report dated Mar. 13, 2025 from the Office Action for Chinese Application No. 202180006587.5 issued Mar. 20, 2025, pp. 1-2.

* cited by examiner

BATTERY MODULE AND METHOD FOR MANUFACTURING THE SAME

TECHNICAL FIELD

Cross-Reference to Related Application

This application is a national stage entry under 35 U.S.C. § 371 of International Application No. PCT/KR2021/005531, filed on Apr. 30, 2021, published in Korean, which claims priority to Korean Patent Application No. 10-2020-0070473, filed on Jun. 10, 2020, the disclosures of which are hereby incorporated by reference herein in their entireties.

TECHNICAL FIELD

The present invention relates to a battery module and a method for manufacturing the same, and more particularly, to a battery module, in which a battery cell increases in heat dissipation performance and decreases in temperature deviation, and a method for manufacturing the same.

BACKGROUND ART

In general, secondary batteries refer to chargeable and dischargeable, unlike primary batteries that are not chargeable. The secondary batteries are being widely used for mobile phones, notebook computers, and camcorders, power storage device, electric vehicles, and the like.

Such a secondary battery is classified into a can type secondary battery in which an electrode assembly is built in a metal can and a pouch type secondary battery in which an electrode assembly is built in a pouch. The pouch type secondary battery comprises an electrode assembly in which an electrode and a separator are alternately stacked, and a pouch accommodating the electrode assembly.

As interests in the depletion of fossil fuels and environmental pollution increase, studies on hybrid vehicles and electric vehicles have been actively conducted in recent years, and a battery pack is mounted on each of the hybrid vehicles or electric vehicles.

The battery pack comprises a battery module comprising a plurality of battery cells, and the plurality of battery cells are connected to each other in series or parallel to increase in capacity and output.

However, the above-described battery module generates more heat as the capacity and output increase, and thus, if the heat generated from the battery module is not smoothly released to the outside, deterioration, ignition, and explosion of the battery module may occur.

DISCLOSURE OF THE INVENTION

Technical Problem

The present invention has been invented to solve the above problems, and according to the present invention, a heat dissipation structure of a battery module may be improved to smoothly discharge heat generated in the battery module to the outside, thereby improving heat dissipation performance of the battery module. Particularly, an object of the present invention is to provide a battery module that is capable of reducing a temperature deviation of the entire battery module and a method for manufacturing the same.

Technical Solution

A battery module according to the present invention for achieving the above objects comprises: a plurality of battery cells disposed to overlap each other in a thickness direction thereof; a battery case configured to accommodate the battery cells and having a structure of which a lower portion is opened; and a heat dissipation member comprising a cover plate coupled to the lower portion of the battery case to support the battery cell and a heat dissipation body provided on one surface of the cover plate, on which the battery cell is supported, to dissipate heat generated in the battery cell, wherein the heat dissipation body comprises a first heat transfer material provided to be connected to a center of one surface of the cover plate in a longitudinal direction of the battery cell and a second heat transfer material provided on both portions of the first heat transfer material and having a structure aligned in a plurality of rows in the longitudinal direction of the battery cell, and the second heat transfer materials are aligned so that an interval therebetween is gradually narrowed from a center toward both ends of the battery cell to gradually improve heat dissipation performance from the center toward both the ends of the battery cell.

The cover plate may comprise a first accommodation groove provided in a center of one surface thereof and having a structure connected in the longitudinal direction of the battery cell and second accommodation grooves provided in both sides of the first accommodation groove in a thickness direction of the battery cell and having a structure, in which an interval therebetween is gradually narrowed from the center toward both the ends of the battery cell, and the first heat transfer material is provided in the first accommodation groove, and the second heat transfer material is provided in the second accommodation groove.

Since the first accommodation groove and the second accommodation groove are formed to be connected to each other, the first and second heat transfer materials may be integrally connected to each other.

An insulating member having an insulating property may be provided on one surface of the cover plate except for the first and second accommodation grooves.

A pair of heat dissipation pads, which reduces a temperature deviation between a center and both the ends of the battery cell by releasing the heat generated at both the ends of the battery cell may be provided on both ends of an inner surface of the battery case, respectively.

A finishing pad that finishes a space between the pair of heat dissipation pads may be provided on the inner surface of the battery case between the pair of heat dissipation pads.

The first accommodation groove may be provided to have a depth that gradually increases from the center toward both the ends of the battery cell, and the first heat transfer material provided in the first accommodation groove may be provided to have a thickness that gradually increases from the center toward both the ends of the battery cell.

A depth may gradually increase from the second accommodation groove disposed at the center of the battery cell toward the second accommodation groove disposed at each of both the ends of the battery cell, and each of the second heat transfer materials provided in the second accommodation groove may be provided to have a thickness that gradually increases from the center toward both the ends of the battery cell.

A method for manufacturing a battery module according to the present invention comprises: a disposition step of disposing a plurality of battery cells to overlap each other in a thickness direction; an accommodation step of accommodating the plurality of overlapping battery cells in a battery case of which a lower portion is opened; a preparation step of preparing a heat dissipation member comprising a cover plate and a heat dissipation body provided on one surface of the cover plate, on which the battery cells are supported; and a coupling step of coupling the cover plate of the heat dissipation member to a lower portion of the battery case and supporting the heat dissipation body on the battery cells, wherein the preparation step comprises a preparation process of preparing the cover plate, a forming process of pressing one surface of the cover plate to form a first accommodation groove and a second accommodation groove, and an injection process of injecting a heat transfer solution into the first accommodation groove and the second accommodation groove to manufacture the heat dissipation body, wherein the heat dissipation body comprises a first heat transfer material formed in the first accommodation groove and a second heat transfer material formed in the second accommodation groove, in the forming process, the first accommodation groove is formed to be connected to a center of one surface of the cover plate in a longitudinal direction of the battery cell, and the second accommodation groove is provided in each of both portions of the first accommodation groove and is formed to have a structure aligned in a plurality of rows in the longitudinal direction of the battery cell, the second accommodation grooves are formed so that an interval between the second accommodation grooves is gradually narrowed from the center toward both the ends of the battery cell on one surface of the cover plate, and the second heat transfer materials provided in the second accommodation groove have a structure, in which an interval between the second heat transfer materials is gradually narrowed from the center toward both the ends of the battery cell.

In the forming process, the first accommodation groove and the second accommodation groove may be formed to be connected to each other, and in the injection process, since the first accommodation groove and the second accommodation groove are connected to each other, the heat dissipation body, in which the first heat transfer material and the second heat transfer material are integrally connected to each other, may be manufactured.

The method may further comprise an attachment process of attaching an insulating member having an insulating property to one surface of the cover plate except for the first accommodation groove and the second accommodation groove between the forming process and the injection process.

The accommodation step may further comprise a process of respectively attaching heat dissipation pads, each of which has heat dissipation performance, to both ends of an inner surface of the battery case, which correspond to both the ends of the battery cell.

The accommodation step may further comprise a process of attaching a finishing pad to the inner surface of the battery case between the heat dissipation pads.

Advantageous Effects

The battery module according to the present invention may comprise the plurality of battery cells, the battery case, and the heat dissipation member comprising the cover plate and the heat dissipation body. The heat dissipation body may comprise the first heat transfer material and the second heat transfer materials, which are arranged in a plurality of rows. Due to the above-described characteristics, the heat generated in the battery cell may be smoothly released through the first and second heat transfer materials, and thus, the increase in temperature of the battery module may be significantly suppressed.

Particularly, the first heat transfer materials, may be aligned so that an interval therebetween is gradually narrowed from the center toward both the ends of the battery cell. Due to the above-described characteristic, the heat dissipation performance may be gradually improved from the center toward both the ends of the battery cell, and thus, the temperature deviation from the center to both the ends of the battery cell may be reduced to improve the performance of the battery module.

In addition, in the battery module according to the present invention, the cover plate may comprise the first accommodation groove and the second accommodation groove, which are formed in a concave shape. The first heat transfer material may be provided in the first accommodation groove, and the second heat transfer material may be provided in the second accommodation groove. Due to the above-described characteristics, the first and second heat transfer materials may be effectively provided.

In addition, in the battery module according to the present invention, the insulating member having the insulating property may be provided on one surface of the cover plate except for the first and second accommodation grooves. Due to the above-described characteristic, the occurrence of the short circuit due to the contact between the battery cell and the cover plate may be previously prevented to improve the safety.

In addition, in the battery module of the present invention, the first accommodation groove may have the depth that gradually increases from the center to both the ends of the battery cell. Due to the above-described characteristic, the first heat transfer material provided in the first accommodation groove may have the height that gradually increases from the center to both the ends of the battery cell, and thus, the heat dissipation performance at both the ends of the battery cell when compared to the center of the battery cell may be improved, and as a result, the temperature deviation of the entire battery cell may be reduced.

In addition, in the battery module of the present invention, the second accommodation groove may have the depth that gradually increases from the center to both the ends of the battery cell. Due to the above-described characteristic, the second heat transfer material provided in the second accommodation groove may have the height that gradually increases from the center to both the ends of the battery cell, and thus, the heat dissipation performance at both the ends of the battery cell when compared to the center of the battery cell may be improved, and as a result, the temperature deviation of the entire battery cell may be reduced.

In addition, in the battery module according to the present invention, the pair of heat dissipation pads may be provided at both the ends of the inner surface of the battery case. Due to the above-described characteristic, the heat dissipation performance at both the ends of the upper portion of the battery cell may be significantly improved, and thus, the temperature deviation of the entire battery cell may be significantly reduced.

MODE FOR CARRYING OUT THE INVENTION

Figure 1:
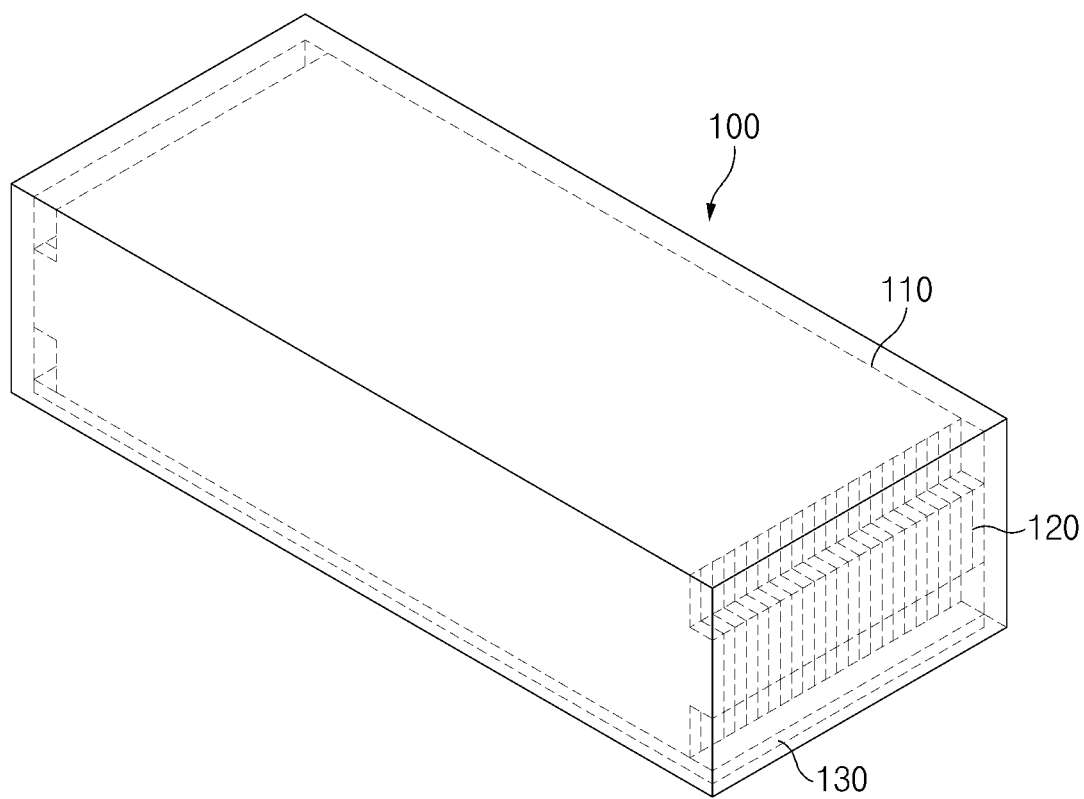
FIG. 1 is a perspective view of a battery module according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Battery Module According to First Embodiment of the Present Invention

As illustrated in FIGS. 1 to 8, in a battery module 100 according to a first embodiment of the present invention, a heat dissipation structure is improved to improve heat dissipation performance of the battery cell and reduce a temperature deviation of the entire battery cell. The battery module 100 comprises a plurality of battery cells 110 disposed to overlap each other in a thickness direction thereof, a battery case 120 accommodating the battery cells 110 and having a structure of which a lower portion is opened, and a heat dissipation member 130 coupled to the lower portion of the battery case 120 to release heat generated in the plurality of battery cells 110, which are accommodated in the battery case 120, to the outside.

Here, in the battery module 100 according to the first embodiment of the present invention, the heat dissipation member is coupled to the lower portion of the battery case as one embodiment, but the heat dissipation member may be provided on an upper portion, a side portion, a front portion, or a rear portion of the battery case according to application of a product.

Battery Cell

The battery cell 110 comprises an electrode assembly, an electrode lead connected to the electrode assembly, and a pouch case accommodating the electrode assembly in a state in which a front end of the electrode lead is drawn out.

The battery cell 110 having the above-described configuration is provided in plurality, which are disposed to overlap each other in the thickness direction, and the plurality of battery cells 110 arranged in the thickness direction have a structure, in which the plurality of battery cells 110 are connected in series or in parallel.

Battery Case

The battery case 120 is configured to accommodate the plurality of battery cells and has a rectangular box shape in which an opening is formed in a lower portion thereof. The plurality of battery cells 110 overlapping each other are accommodated in the battery case 120 through the opening.

Each of the battery cells 110 is accommodated in the battery case 120 in a state in which the electrode lead faces an end in a longitudinal direction of the battery case 120 and is upright.

Heat Dissipation Member

The heat dissipation member 130 comprises a cover plate 131 supporting the battery cell 110 accommodated in the battery case 120 and a heat dissipation body 132 releasing heat generated in the battery cell 110 to the outside.

The cover plate 131 may be coupled to the lower portion of the battery case 120 to finish the lower portion of the battery case 120 and also supports the lower portion of the battery cell 110 accommodated in the battery case 120 to prevent the battery cell 110 from being drawn out to the outside.

Particularly, the cover plate 131 is made of a heat dissipation material that is capable of smoothly releasing the heat of the battery cell, which is transferred from the heat dissipation body.

The heat dissipation body 132 is provided on one surface of the cover plate 131, on which the battery cell 110 is supported, to absorb the heat generated in the battery cell 110, thereby releasing the heat to the outside. Thus, the heat of the battery cell 110 may be effectively dissipated.

Figure 4:
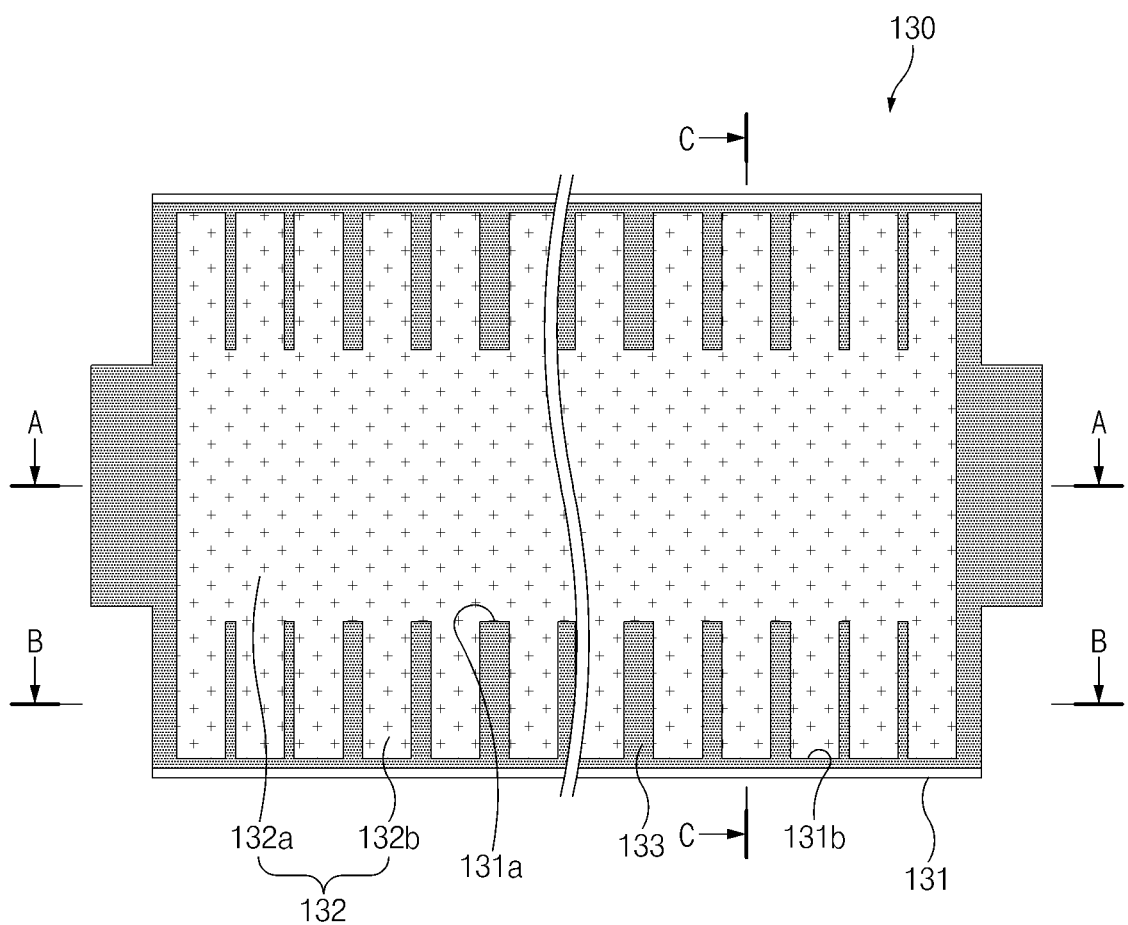
FIG. 4 is a plan view illustrating the heat dissipation member of the battery module according to the first embodiment of the present invention.
Figure 5:
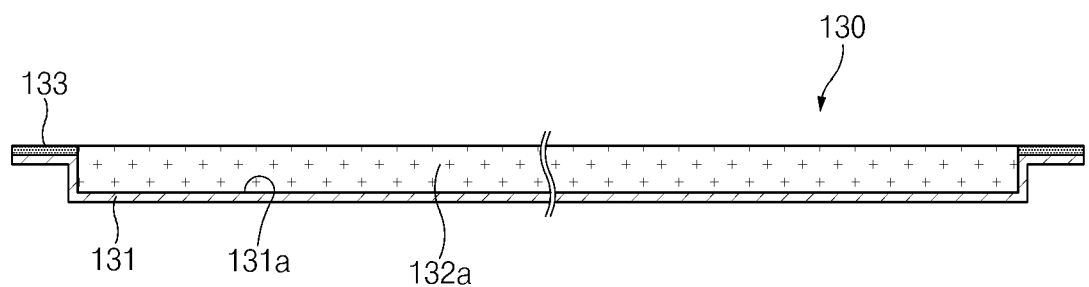
FIG. 5 is a cross-sectional view taken along line A-A of FIG. 4.
Figure 6:
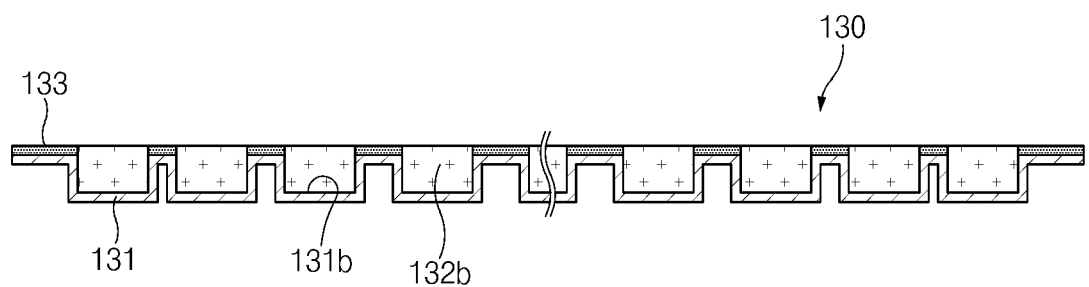
FIG. 6 is a cross-sectional view taken along line B-B of FIG. 4.
Figure 7:
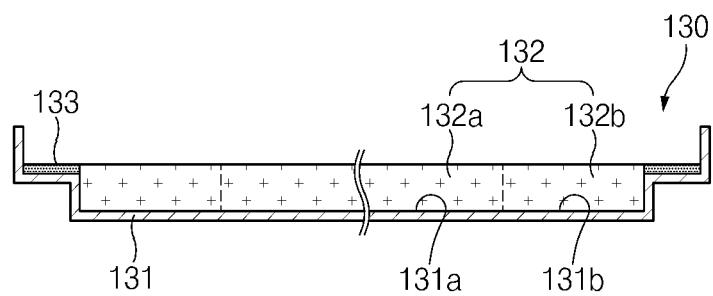
FIG. 7 is a cross-sectional view taken along line C-C of FIG. 4.
Figure 8:
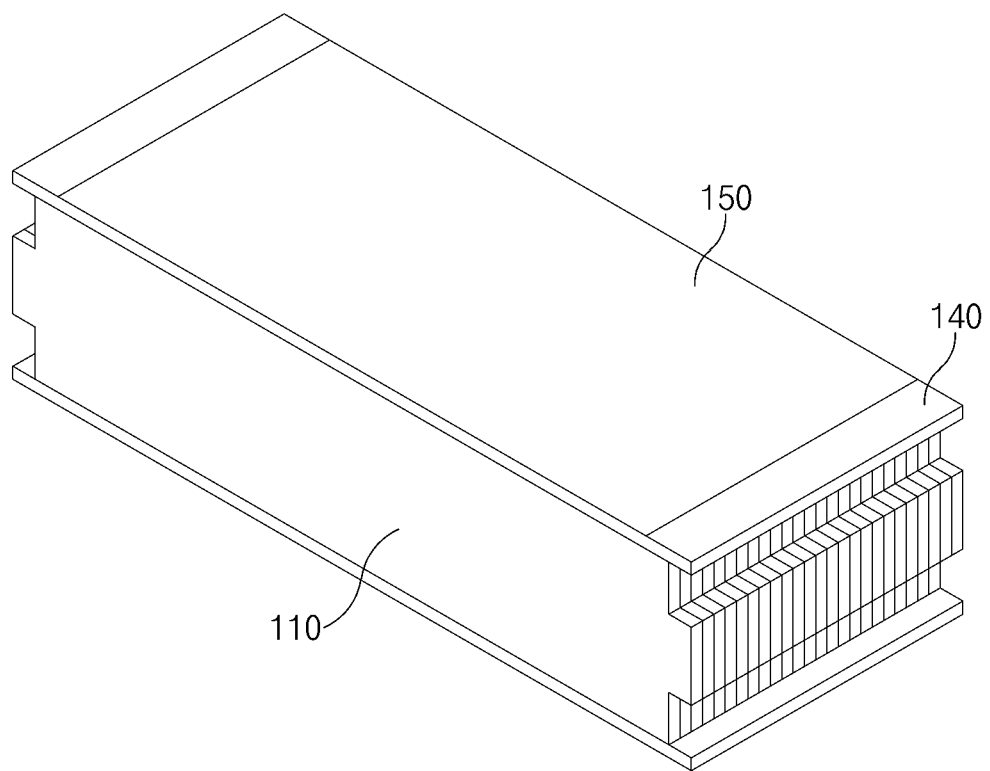
FIG. 8 is a perspective view of a heat dissipation pad and a finishing pad in the battery module according to the first embodiment of the present invention.
Figure 9:
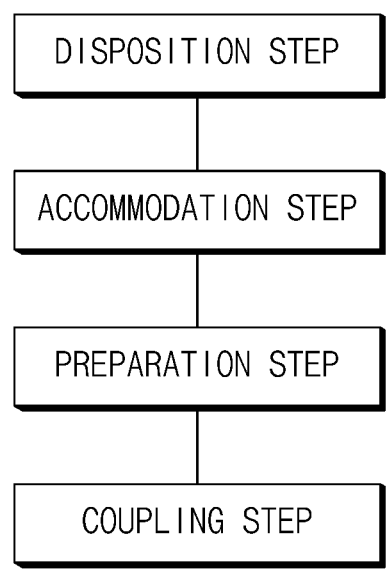
FIG. 9 is a flowchart illustrating a method for manufacturing the battery module according to the first embodiment of the present invention.

Particularly, the heat dissipation body 132 comprises a first heat transfer material 132a provided to be connected to a center of one surface of the cover plate 131 in a longitudinal direction (a left and right direction of the cover plate when viewed in FIG. 4) of the battery cell and a second heat transfer material 132b provided at each of both portions (upper and lower portions of the first heat transfer material when viewed in FIG. 4) of the first heat transfer material 132a and having a structure arranged in a plurality of rows in the longitudinal direction (the left and right direction of the cover plate when viewed in FIG. 4) of the battery cell.

Each of the first and second heat transfer materials 132a and 132b may be provided as a contact thermal interface material (TIM) and have an adhesive property. Particularly, at least one of heat dissipation grease, a thermal conductive adhesive, or a phase change material may be used as each of the first and second heat transfer materials 132a and 132b.

The heat dissipation body 132 having the above-described configuration may be differently applied to a center of the battery cell 110, at which a relatively large amount of heat is generated, and both overlapping portions of the battery cell 110, at which a relatively small amount of heat when compared to that of the center of the battery cell 110 is generated, and thus, the heat dissipation performance of the battery cell 110 may be improved, and also, the temperature deviation between the center and both the portions of the battery cell 110 may be reduced.

In the battery cell 110, relatively high-temperature heat is generated at both ends rather than a central portion of the battery cell 110 due to high resistance by the electrode lead. The present invention has the arrangement structure of the second heat transfer materials 132*b* for reducing the temperature deviation of the battery cell 110 as described above.

That is, the second heat transfer materials 132*b* have a structure aligned in a plurality of rows so that an interval therebetween is gradually narrowed from an outer central point (a point at which the battery cell is bisected in the longitudinal direction) toward both ends (both end points of the battery cell in the longitudinal direction). Thus, more second heat transfer materials 132*b* are arranged at both the ends of the battery cell, which generates high-temperature heat are arranged to significantly improve the heat dissipation performance, and less second heat transfer materials 132*b* are arranged at the central portion of the battery cell, which generate low-temperature heat to slightly improve the heat dissipation performance. As a result, the temperature deviation may be significantly reduced due to a difference in heat dissipation performance between the central portion and both the ends of the battery cell.

The heat dissipation member 130 having the above configuration may significantly improve the heat dissipation performance of the plurality of battery cells 110 accommodated in the battery case 120, and in particular, may reduce the temperature deviation of the plurality of entire battery cells to improve performance of the battery cells.

In the heat dissipation member 130, the cover plate 131 comprises a first accommodation groove 131*a* provided in a center of one surface thereof and having a structure connected in a longitudinal direction of the battery cell 110 and second accommodation grooves 131*b* respectively provided in both sides of the first accommodation groove 131*a* in a thickness direction of the battery cell 110 and having a structure, in which an interval therebetween is gradually narrowed from the center toward both ends of the battery cell 110.

Here, the first heat transfer material 132*a* is provided in the first accommodation groove 131*a*, and the second heat transfer material 132*b* is provided in the second accommodation groove 131*b*.

Figure 3:
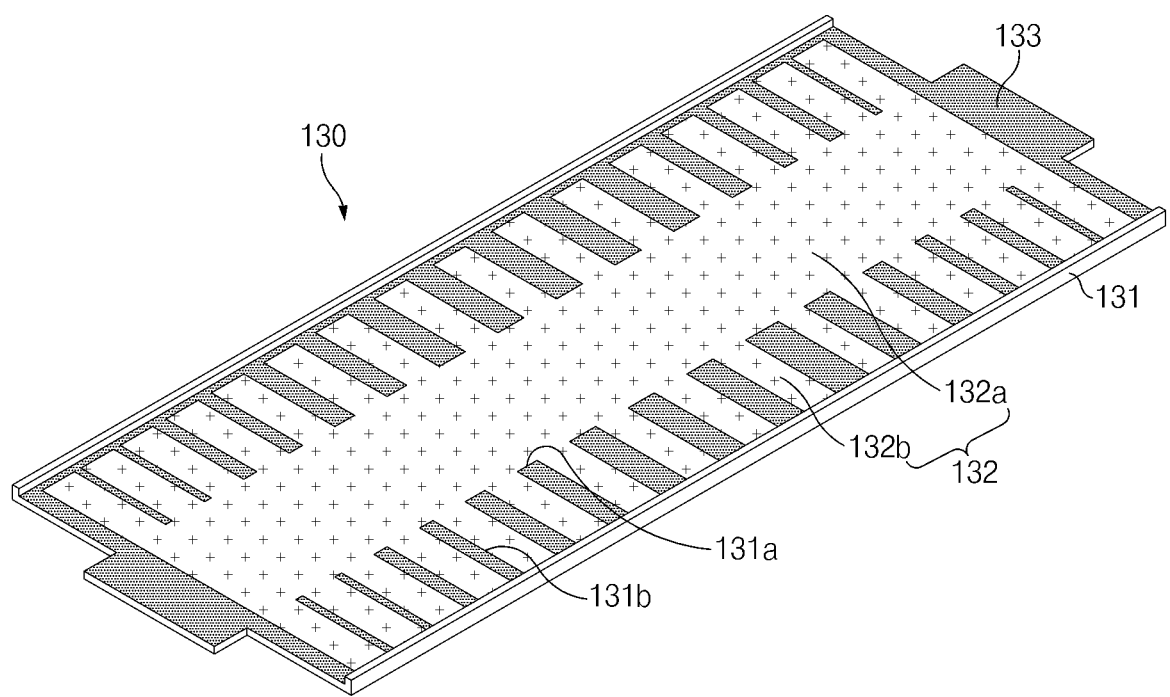
FIG. 3 is a perspective view illustrating a heat dissipation member of the battery module according to the first embodiment of the present invention.

The first accommodation groove 131*a* and the second accommodation groove 131*b* have a structure formed in a concave shape on a top surface of the cover plate 131 when viewed in FIG. 3.

Also, the first heat transfer material 132*a* and the second heat transfer materials 132*b* are made of the same material.

The heat dissipation member 130 having the above-described configuration forms the first accommodation groove 131*a* and the second accommodation groove 131*b* in one surface of the cover plate 131 to easily form the first heat transfer material 132*a* and the second heat transfer materials 132*b*.

The first accommodation groove 131*a* and the second accommodation groove 131*b* are formed to be connected to each other. Thus, the first and second heat transfer materials 132*a* and 132*b* provided in the first accommodation groove 131*a* and the second accommodation groove 131*b* may be integrally connected to each other, and as a result, heat generated in the battery cell 110 may be dispersed throughout the first and second heat transfer materials 132*a* and 132*b* to improve the heat dissipation performance.

An insulating member 133 having an insulating property is provided on one surface of the cover plate 131 except for the first and second accommodation grooves 131*a* and 131*b*. That is, the insulating member 133 insulates the battery cell 110 and the cover plate 131 from each other to prevent a short circuit that may occur when the battery cell 110 and the cover plate 131 are in contact with each other.

The insulating member 133 has an adhesive tape shape and is attached to one surface of the cover plate 131. Therefore, convenience of use may be improved.

Particularly, a coating layer is further provided between an end of the insulating member 133 and the cover plate 131 to prevent the heat transfer material from being introduced between the end of the insulating member 133 and the cover plate. Particularly, the coating layer may prevent the end of the insulating member 133 from being separated the cover plate 131.

The battery module 100 according to the first embodiment of the present invention further comprises a heat dissipation pad 140.

Heat Dissipation Pad

The heat dissipation pad 140 is configured to reduce a temperature deviation between the upper central portion and both the ends of the battery cell That is, both the ends of the battery cell generate heat having a temperature higher than that of the center of the battery cell because the electrode leads are connected, and thus, the heat dissipation pads 140 may be further provided to reduce the temperature deviation between the center of the top surface and both the ends of the battery cell.

The heat dissipation pads 140 are attached to both sides of an inner surface of the battery case 120, respectively, and both ends of the top surface of the battery cell 110 accommodated in the battery case 120 are supported to release heat through both the ends of the top surface of the battery cell 110. Thus, the temperature deviation between the center and both the ends of the battery cell may be significantly reduced through the increase in heat dissipation performance at both the ends of the battery cell.

A finishing pad 150 may be further provided to constantly maintain an interval between the heat dissipation pads 140, which are attached to both sides of the inner surface of the battery case 120, respectively.

Finishing Pad

The finishing pad 150 is attached to the inner surface of the battery case 120 between the pair of heat dissipation pads 140 to constantly maintain the interval between the pair of heat dissipation pads 140. Particularly, the finishing pad 150 may finish a space between the pair of heat dissipation pads 140 to prevent the battery cell 110 from being deformed because the battery cell 110 is inserted into the space between the pair of heat dissipation pads 140.

Hereinafter, a method for manufacturing the battery module according to the first embodiment of the present invention will be described.

Method for Manufacturing Battery Module According to First Embodiment of the Present Invention As illustrated in FIGS. 9 to 13, a method for manufacturing the battery module according to the first embodiment of the present invention comprises a disposition step, an accommodation step, a preparation step, and a coupling step.

Disposition Step

In the disposition step, a plurality of battery cells 110 are prepared, the plurality of prepared battery cells 110 are disposed to overlap each other in a thickness direction, and the plurality of battery cells 110, which are disposed to overlap each other, are connected to each other in series or parallel to be in contact with each other.

Accommodation Step

In the accommodating step, the plurality of battery cells 110 overlapping each other are accommodated in the battery case 120 having an opened lower portion. Here, each of the battery cells 110 is accommodated in a state in which the electrode lead faces an end in a longitudinal direction of the battery case 120 and is upright.

The accommodation step further comprises a step of attaching the heat dissipation pad 140 to both ends of an inner surface of the battery case 120, which correspond to both ends of a top surface of the battery cell 110, respectively, and the heat dissipation pad 140 improves heat dissipation performance at both the ends of the top surface of the battery cell 110.

In addition, the accommodation step further comprises a step of attaching a finishing pad 150 to the inner surface of the battery case 120 between the heat dissipation pads 140, and the finishing pad 150 constantly maintains an interval between the pair of heat dissipation pads 140 to finish a space between the pair of heat dissipation pads 140.

Preparation Step

The preparation steps comprises a preparation process of preparing the cover plate 131, a forming process of forming an accommodation groove for providing a heat dissipation body in the cover plate 131, and an injection process of manufacturing a heat dissipation body 132 through the accommodation groove formed in a cover plate 131.

Figure 10:
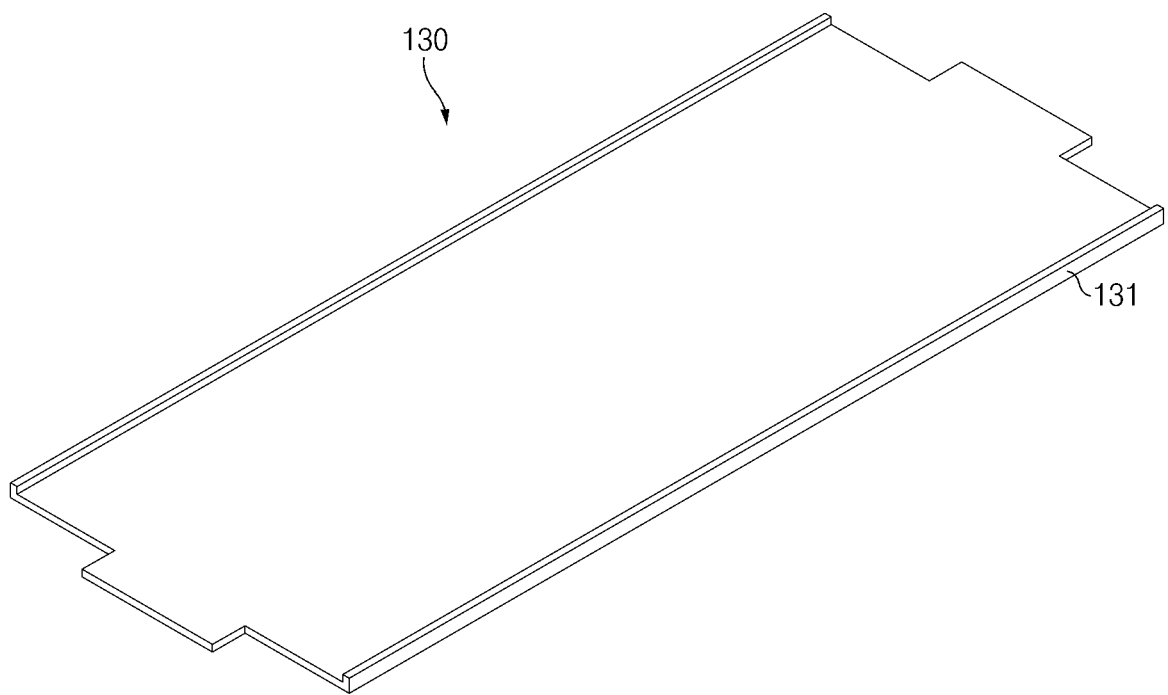
FIGS. 10 to 13 are flowcharts illustrating a preparation step of the method for manufacturing the battery module according to the first embodiment of the present invention.

Referring to FIG. 10, in the preparation process, the cover plate 131 having a size and shape corresponding to an opened lower portion of the battery case 120 is prepared.

Figure 11:
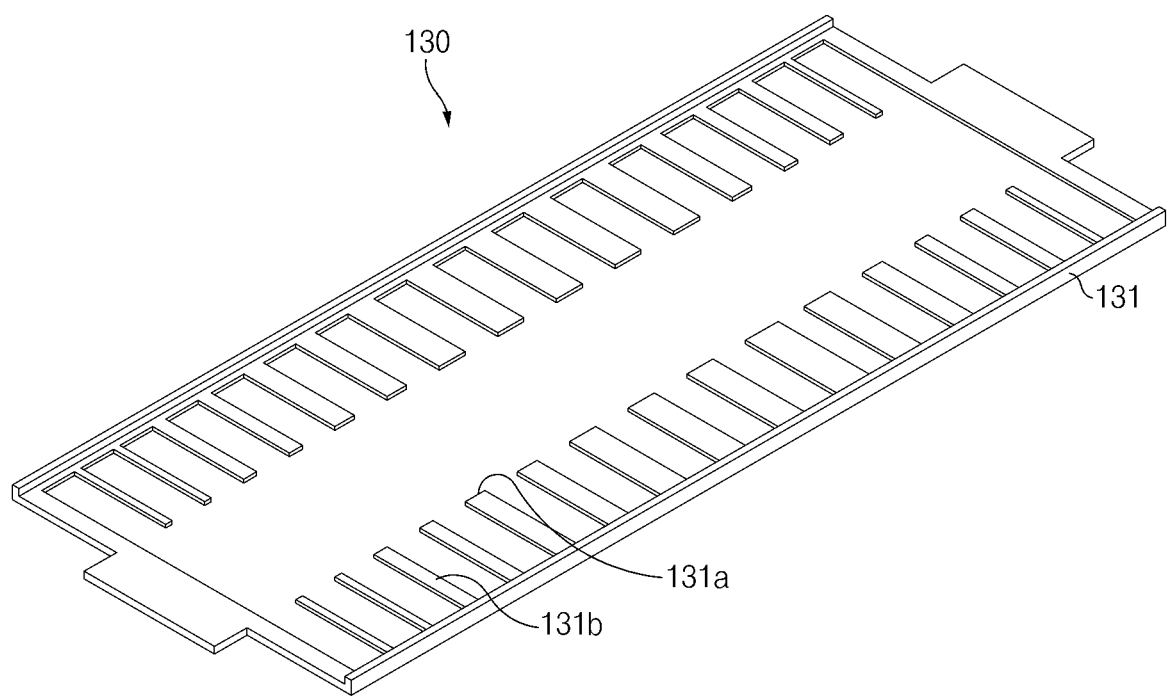

Referring to FIG. 11, in the forming process, a first accommodation groove 131a and a second accommodation groove 131b, each of which is formed in a concave shape by pressing one surface (a top surface of the cover plate when viewed in FIG. 11) of the cover plate 131 by using a press, are formed.

Here, the first accommodation groove 131a is formed to be connected to a center of one surface of the cover plate 131 in a longitudinal direction of the battery cell, and the second accommodation groove 131b is provided in both portions of the first accommodation groove 131a and having a structure aligned in a plurality of rows in the longitudinal direction of the battery cell 110.

Particularly, the second accommodation grooves 131b are formed in one surface of the cover plate 131 so that an interval between the second accommodation grooves 131b is gradually narrowed from a center toward both ends of the battery cell 110. Thus, the second heat transfer materials 132b provided in the second accommodation groove 131b may be manufactured to have a structure in which an interval between the second heat transfer materials 132b is gradually narrowed from the center toward both the ends of the battery cell 110.

A heat dissipating member 130 provided with a heat dissipation body 132 provided on one surface of the cover plate 131, on which the battery cell 110 is supported, is prepared.

In the forming process, the first accommodation groove 131a and the second accommodation groove 131b are formed to be connected to each other. Thus, even if a heat transfer solution is injected into the first accommodation groove 131a or the second accommodation groove 131b, the heat transfer solution may be injected up to other accommodation grooves, and as a result, operation efficiency may be improved. Particularly, since the first and second heat transfer materials 132a and 132b manufactured in the first accommodation groove 131a and the second accommodation groove 131b may be manufactured to be integrally connected to each other, thereby improving heat dissipation performance.

An attachment process of attaching an insulating member having an insulating property to one surface of the cover plate 131 except for the first accommodation groove 131a and the second accommodation groove 131b is performed between the forming process and the injection process.

Figure 12:
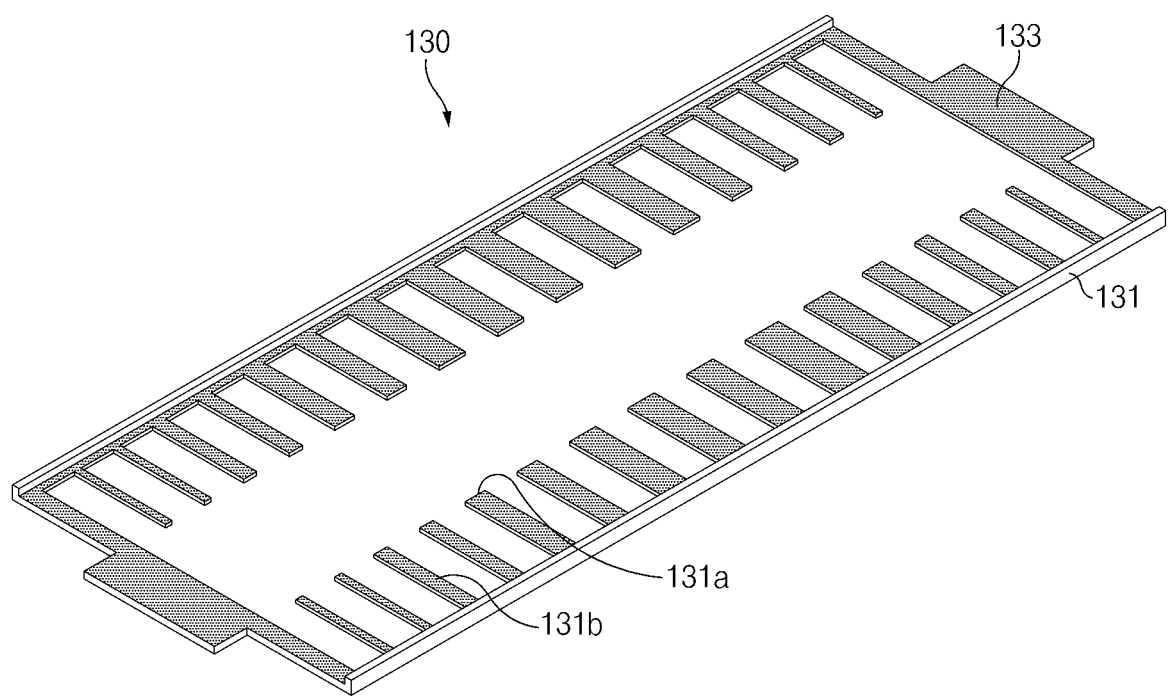

In the attachment process, referring to FIG. 12, the insulating member 133 having adhesive force is attached to one surface of the cover plate 131. Here, in order to prevent an end of the insulating member 133 from being separated, a coating solution is applied between an end of the insulating member 133 and the cover plate 131 to prepare a coating layer.

Figure 13:
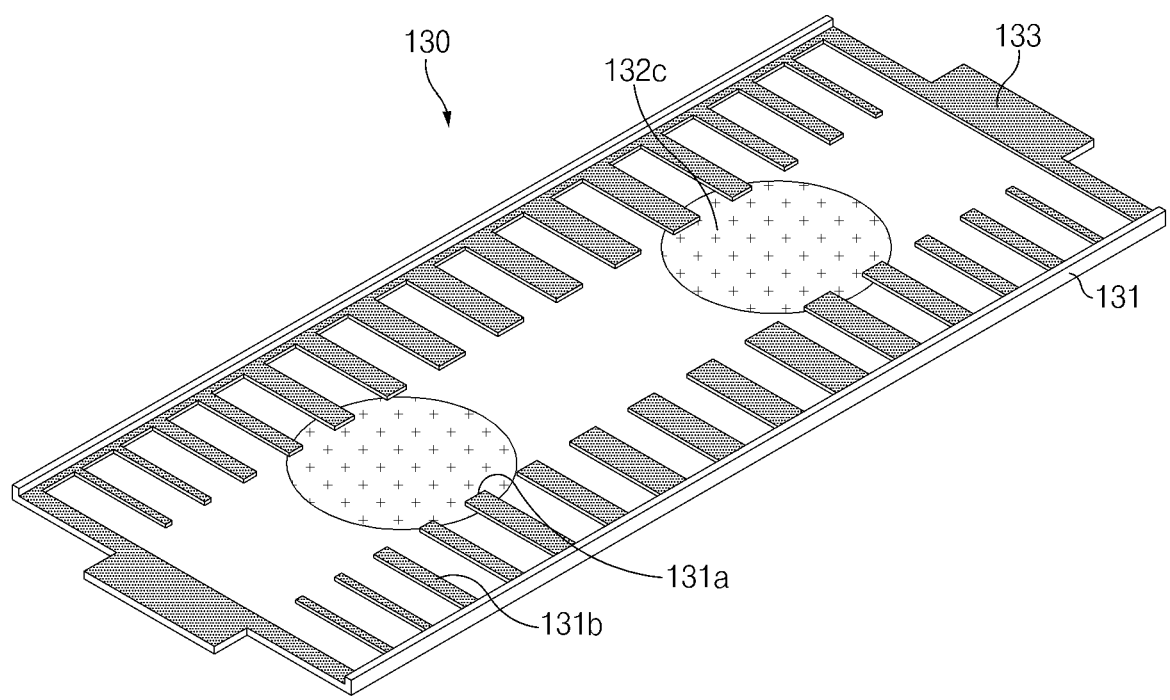

Referring to FIG. 13, in the injection process, a heat transfer solution 132c is injected into the first accommodation groove 131a and the second accommodation groove 131b to manufacture a heat dissipation body 132 comprising the first heat transfer material 132a and the second heat transfer material 132b. That is, as the heat transfer solution 132c is applied to the first accommodation groove 131a and solidified, the first heat transfer material 132a is prepared, and as the heat transfer solution 132c is applied to the second accommodation groove 131b and solidified, the second heat transfer material 132b is prepared. Here, since the first accommodation groove 131a and the second accommodation groove 131b are connected to each other, the first heat transfer material 132a and the second heat transfer material 132b may be manufactured to be integrally connected to each other.

Figure 2:
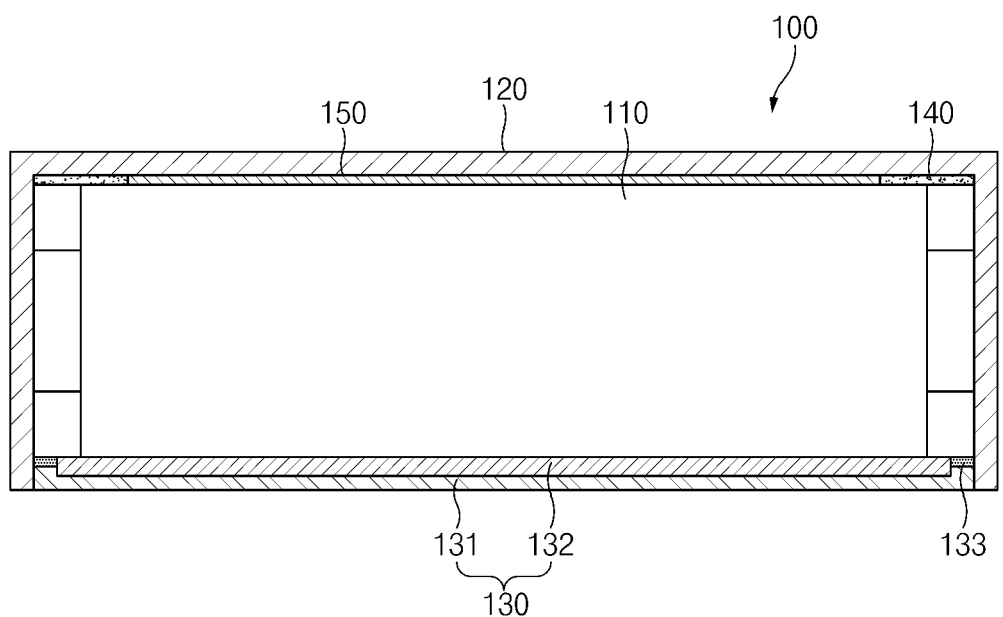
FIG. 2 is a cross-sectional view of the battery module according to the first embodiment of the present invention.

Therefore, when the method for manufacturing the battery module according to the first embodiment of the present invention is completed, the finished battery module 100 illustrated in FIG. 2 may be manufactured.

Hereinafter, in descriptions of another embodiment of the present invention, constituents having the same function as the above-mentioned embodiment have been given the same reference numeral in the drawings, and thus duplicated description will be omitted.

Battery Module According to Second Embodiment of the Present Invention

Figure 14:
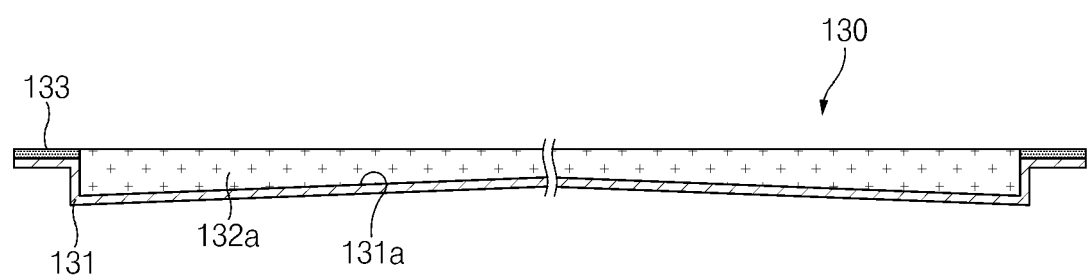
FIG. 14 is a cross-sectional view illustrating a heat dissipation member of a battery module according to a second embodiment of the present invention.

As shown in FIG. 14, a battery module 100 according to a second embodiment of the present invention comprise a first accommodation groove 131a provided in a center of one surface thereof and having a structure connected in a longitudinal direction of the battery cell 110 and second accommodation grooves 131b provided in both sides of the first accommodation groove 131a in a thickness direction of the battery cell 110 and having a structure, in which an interval therebetween is gradually narrowed from the center toward both ends of the battery cell 110.

Here, the first accommodation groove 131a is provided to gradually increase in depth from the center to both the ends of the battery cell 110, and thus, the first heat transfer material 132a provided in the first accommodation groove 131a has a structure in which a height thereof gradually increases from the center to both the ends of the battery cell 110.

Therefore, in the battery module 100 according to the second embodiment of the present invention, heat dissipation performance may be applied differently from the middle to both the ends of the battery cell 110 disposed at the center, and thus, the battery cell disposed at the center of the battery case may be reduced in temperature deviation.

Battery Module According to Third Embodiment of the Present Invention

Figure 15:
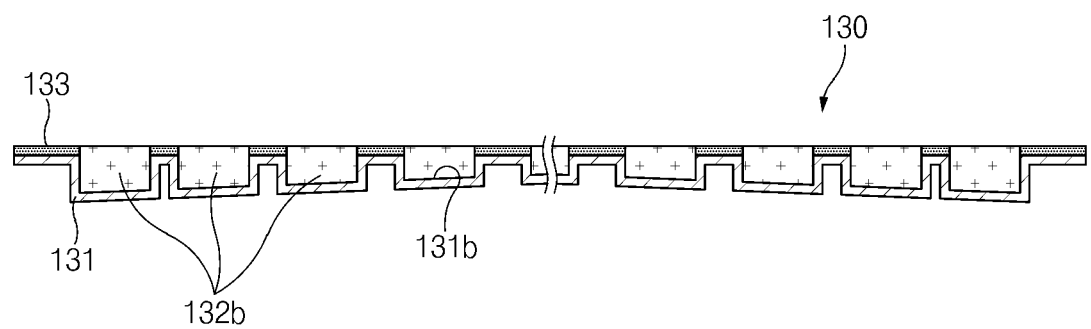
FIG. 15 is a cross-sectional view illustrating a heat dissipation member of a battery module according to a third embodiment of the present invention.

As shown in FIG. 15, a battery module 100 according to a third embodiment of the present invention comprise a first accommodation groove 131a provided in a center of one surface thereof and having a structure connected in a longitudinal direction of the battery cell 110 and second accommodation grooves 131b provided in both sides of the first accommodation groove 131a in a thickness direction of the battery cell 110 and having a structure, in which an interval therebetween is gradually narrowed from the center toward both ends of the battery cell 110.

Here, the second accommodation groove 131b is provided to gradually increase in depth from the center to both the ends of the battery cell 110, and thus, the second heat transfer material 132b provided in the second accommodation groove 131b has a structure in which a height thereof gradually increases from the center to both the ends of the battery cell 110.

Therefore, in the battery module 100 according to the second embodiment of the present invention, heat dissipation performance may be more precisely adjusted from the middle to both the ends of the battery cell 110 disposed at each of both the ends of the battery case, and thus, the battery cell disposed at each of both the ends of the battery case may be reduced in temperature deviation.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Battery module
110: Battery cell
120: Battery case
130: Heat dissipation member
131: Cover plate
131a: First accommodation groove
131b: Second accommodation groove
132: Heat dissipation body
132a: First heat transfer material
132b: second heat transfer material
133: Insulating member
140: Heat dissipation pad
150: Finishing pad

The invention claimed is:

1. A battery module comprising:
a plurality of battery cells overlapping each other in a thickness direction thereof;
a battery case accommodating the battery cells therein and having a structure in which a lower portion is opened; and
a heat dissipation member comprising a cover plate coupled to the lower portion of the battery case and supporting the battery cells and a heat dissipation body disposed on a first surface of the cover plate, the battery cells being supported on the heat dissipation member, the heat dissipation member being configured to dissipate heat generated in the battery cells,
wherein the heat dissipation body comprises a first heat transfer material connected to a center of a first surface of the cover plate in a longitudinal direction of the battery cells and a second heat transfer material extending from opposite sides of the first heat transfer material and shaped in a plurality of adjacent rows in the longitudinal direction of the battery cells, and
the adjacent rows of the second heat transfer material are aligned so that intervals therebetween are gradually narrowed from a center of the battery cells toward two opposite ends of the battery cells, the second heat transfer material being configured to improve heat dissipation performance in the longitudinal direction from the center toward the two opposite ends of the battery cells.

2. The battery module of claim 1, wherein the cover plate comprises a first accommodation groove disposed in a center of the first surface thereof and extending in the longitudinal direction of the battery cells and second accommodation grooves extending from opposite sides of the first accommodation groove in a thickness direction of the battery cells, the second accommodation grooves defining intervals therebetween that are gradually narrowed from the center toward the two opposite ends of the battery cells, and
the first heat transfer material is disposed in the first accommodation groove, and the second heat transfer material is disposed in the second accommodation grooves.

3. The battery module of claim 2, wherein, the first accommodation groove and the second accommodation groove are connected to each other, and the first and second heat transfer materials are integrally connected to each other.

4. The battery module of claim 2, further comprising an insulating member having an insulating property disposed on the first surface of the cover plate at locations outside of the first and second accommodation grooves.

5. The battery module of claim 1, further comprising a pair of heat dissipation pads, the heat dissipation pads being configured to reduce a temperature deviation between the center and the two opposite ends of the battery cells by releasing heat generated at the opposite ends of the battery cells, the pair of heat dissipation pads being disposed on opposite ends of an inner surface of the battery case, respectively.

6. The battery module of claim 5, further comprising a finishing pad that is disposed within a space between the pair of heat dissipation pads, the finishing pad being is disposed on the inner surface of the battery case between the pair of heat dissipation pads.

7. The battery module of claim 2, wherein the first accommodation groove is has a depth that gradually increases from the center toward the two opposite ends of the battery cells, and the first heat transfer material provided in the first accommodation groove has a thickness that gradually increases from the center toward the two opposite ends of the battery cells.

8. The battery module of claim 2, wherein the second accommodation grooves have depths that gradually increase from the center of the battery cells toward the two opposite ends of the battery cells, and
the rows of the second heat transfer material have thicknesses that gradually increase from the center toward the two opposite ends of the battery cells.

9. A method for manufacturing a battery module, the method comprising:
arranging a plurality of battery cells to overlap each other in a thickness direction;
accommodating the plurality of battery cells within a battery case of which a lower portion is opened;
preparing a heat dissipation member comprising a cover plate and a heat dissipation body disposed on a first surface of the cover plate, the battery cells being supported on the heat dissipation member; and
coupling the cover plate of the heat dissipation member to the lower portion of the battery case and positioning the heat dissipation body on the battery cells, wherein the preparing comprises a preparation process of preparing the cover plate, a forming process of pressing the first surface of the cover plate to form a first accommodation groove and second accommodation grooves, and an injection process of injecting a heat transfer solution into the first accommodation groove and the second accommodation grooves to manufacture the heat dissipation body, wherein the heat dissipation body comprises a first heat transfer material formed in the first accommodation groove and a second heat transfer material formed in the second accommodation grooves, in the forming process, the first accommodation groove is formed from a center of the first surface of the cover plate and extends in a longitudinal direction of the battery cells, and the second accommodation grooves extend from opposite sides of the first accommodation groove and are shaped in a plurality of adjacent rows in the longitudinal direction of the battery cells, the second accommodation grooves define intervals therebetween that are gradually narrowed from a center of the battery cells toward two opposite ends of the battery cells on one the first surface of the cover plate, and adjacent rows of the second heat transfer material define intervals therebetween that are gradually narrowed from the center toward the two opposite ends of the battery cells.

10. The method of claim 9, wherein the first accommodation groove and the second accommodation groove are connected to each other, and during the injection process, the first heat transfer material and the second heat transfer material are formed integrally connected to each other.

11. The method of claim 9, further comprising attaching an insulating member having an insulating property to the first surface of the cover plate at locations outside of the first accommodation groove and the second accommodation grooves, the attaching being between the forming process and the injection process.

12. The method of claim 9, wherein the accommodating further comprises attaching heat dissipation pads, each of which has a heat dissipation property, to opposite ends of an inner surface of the battery case that are adjacent to the two opposite ends of the battery cells, respectively.

13. The method of claim 12, wherein the accommodating further comprises attaching a finishing pad to the inner surface of the battery case between the heat dissipation pads.

* * * * *